(12) United States Patent
Sarferaz

(10) Patent No.: US 9,934,295 B2
(45) Date of Patent: Apr. 3, 2018

(54) IN-MEMORY DATA WAREHOUSE PLANNING AND BROADCASTING

(71) Applicant: Siar Sarferaz, Heidelberg (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 714 days.

(21) Appl. No.: 14/466,113

(22) Filed: Aug. 22, 2014

(65) Prior Publication Data

US 2016/0055222 A1 Feb. 25, 2016

(51) Int. Cl.
  *G06F 17/30* (2006.01)
(52) U.S. Cl.
  CPC .. *G06F 17/30563* (2013.01); *G06F 17/30587* (2013.01)
(58) Field of Classification Search
  CPC ......... G06F 17/30587; G06F 17/30563; G06F 17/30551; G06F 17/30592
  USPC .................. 707/600, 603; 705/7.11; 719/317
  See application file for complete search history.

(56) References Cited

U.S. PATENT DOCUMENTS

| | | | | |
|---|---|---|---|---|
| 2007/0266000 | A1* | 11/2007 | Piedmonte | G06F 17/30424 |
| 2011/0282704 | A1* | 11/2011 | Graeber | G06Q 10/06 705/7.11 |
| 2012/0137307 | A1* | 5/2012 | Sarferaz | G06Q 10/10 719/317 |
| 2012/0259809 | A1* | 10/2012 | Hermann | G06F 17/30563 707/600 |

* cited by examiner

*Primary Examiner* — Monica Pyo
(74) *Attorney, Agent, or Firm* — Schwegman Lundberg & Woessner, P.A.

(57) ABSTRACT

Various embodiments herein each include at least one of systems, methods, and software for in memory data warehouse planning and broadcasting. Some embodiments include an in memory database having a set of define database table views that provide a virtual data model upon which services execute for various purposes including planning, simulation, and broadcasting of generated reports and other document. These services are executed within a computing environment of the in memory database and can be configured and grouped into applications and processes. Such embodiments eliminate system performance bottlenecks and provide a platform upon which "extreme" application performance can be obtained.

12 Claims, 10 Drawing Sheets

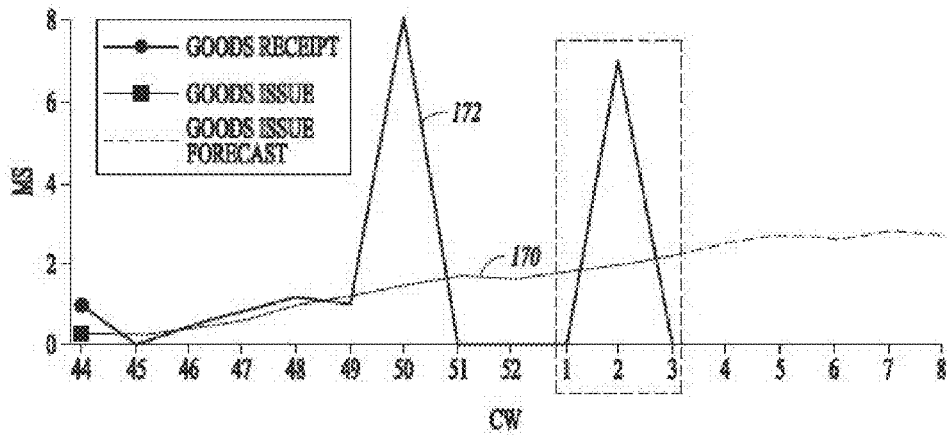

FIG. 1D

```
1
2
3   BEGIN
4       lt_input = select "YearWeek" as ID, sum("GoodsIssueLevel_E") as RAWDATA
5           from "_SYS_BIC" . "temp . afipoc/MICMATLGRGILEVELQUERY" — 182
6           where "SAPClient" = MAP(:P_SAPClient, null, '004', '', '004', :P_SAPClient)
7           and "Material" = :P_Material
8           and "ValuationsArea" = :P_ValuationArea
9           and "Date" > MAP( :P_FromDate, null, '20100101', :P_FromDate)
10          and "Date" > MAP( :P_ToDate, null, '20130101', :P_ToDate)
11          group by "Material", "YearWeek" order by "YearWeek" ASC;
12
13
14      lt_ctrl = select * from "PAL_POC" . "CONTROL_TAB"; — 183
15
16                                      184
17      CALL "SYS_AFL" . "TRIPLESMOOTH_TEST" ( :lt_input, :lt_ctrl, lt_out); — 185
18      var_out = select 'GIFC' as APP, "TIME" as PERIOD, "OUTPUT" as VAL from "lt_out;
19  END       186
20
```

IN-MEMORY DATA WAREHOUSE PLANNING AND BROADCASTING

BACKGROUND INFORMATION

An in memory database platform is deployable as an on premise appliance, or as a remote server, sometimes referred to as being in the cloud. It is a platform that is best suited for performing real-time analytics, and developing and deploying real-time applications. At the core of this real-time data platform is an in memory database which is fundamentally different than common database engines where data is stored in slower but cheaper storage devices such as disk drive devices.

Database management systems on the market are typically either good at transactional workloads, or analytical workloads, but not both. When transactional database management systems are used for analytical workloads, they require separating workloads into different databases such as OLAP, Online Analytical Processing and OLTP, Online Transaction Processing. Data from transactional systems have to be transformed for reporting, and loaded into a reporting database. The reporting database still requires significant effort in creating and maintaining tuning structures such as aggregates and indexes to provide even moderate performance. Further, lagging performance of such systems reduces abilities of systems to monitor organizational performance for purposes of providing notices upon occurrences of significant events that may be reflected in stored data. This lagging system performance also is a confound to timely forecasting and generating and maintain plans based on complex organizational structures, rules, policies, and markets.

BRIEF DESCRIPTION OF THE DRAWINGS

FIG. 1D is graph illustrating a sales forecast according to an example embodiment.

FIG. 1E is diagram illustrating SQL script to invoke a triple smoothing function according to an example embodiment.

FIG. 7 is an example planning and simulation output, according to an example embodiment.

DETAILED DESCRIPTION

Figure 1A:
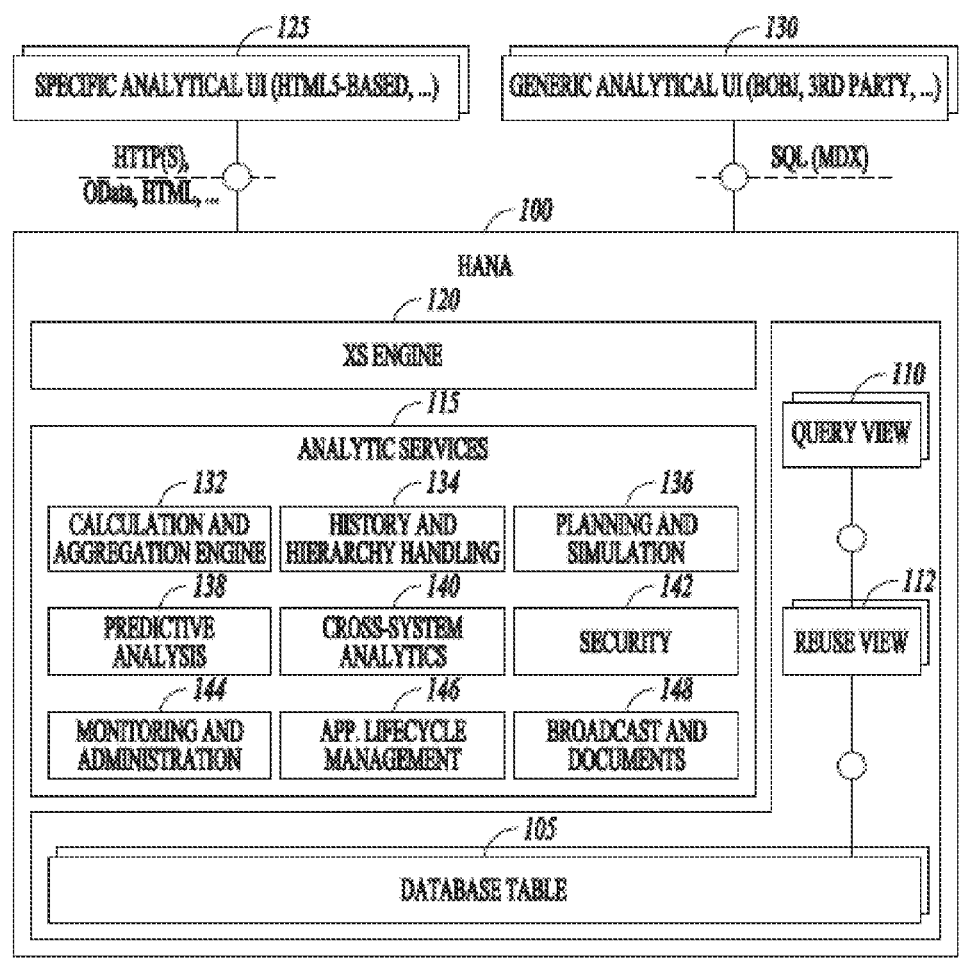
FIG. 1A is a block diagram of an in memory data warehouse according to an example embodiment.

Various embodiments herein each include at least one of systems, methods, and software for in memory data warehouse planning and broadcasting. Some embodiments include an in memory database having a set of define database table views that provide a virtual data model upon which services execute for various purposes including planning, simulation, and broadcasting of generated reports and other document. These services are executed within a computing environment of the in memory database and can be configured and grouped into applications and processes. Such embodiments eliminate system performance bottlenecks and provide a platform upon which "extreme" application performance can be obtained.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Due to its hybrid structure for processing transactional workloads and analytical workloads fully in-memory, an in memory database modified with analytic services and views combines the best of both worlds. It is no more necessary to take the time to load data from a transactional database into a separate reporting database, or even build traditional tuning structures to enable reporting. Reporting may be performed as transactions are happening. By consolidating two landscapes (OLAP and OLTP) into a single database, the in memory database may provide a massively lower total cost of operation in addition to increased speed.

A new application programming paradigm enables extreme applications. Since the in memory database data table resides entirely in-memory all the time, additional complex calculations, functions and data-intensive operations can happen on the data directly in the database, without requiring time-consuming and costly movements of data between the database and applications. This simplification and optimization of a data layer is a feature of the in memory database that removes multiple layers of technology and significant human effort to get high speed and lower total cost of ownership.

FIG. 1A is a block diagram of an in memory data warehouse system 100. The in memory data warehouse system 100 includes an in memory database system. The in memory data warehouse system 100 includes a random access memory to store in memory database tables 105 and a stored set of defined views, such as query views 110 and reuse views 112, over the database tables 105. The stored set of analytical services 115 is adapted to provide transaction services and warehouse services. The in memory data warehouse system 100 also includes an engine 120 to run the analytical services 115 on the database tables 105 and an interface, such as a specific analytical user interface 125, a generic analytical user interface 130. Other user interfaces may be present in some embodiments to interact with users and provide access to the engine 120, analytical services 115, and views 110 to perform transactions, data warehouse functions, other data functions. Such other data functions may be related to automatic generation of documents and distribution thereof, functions related to building and executing defined plans, and executing simulations on or with data from the database tables 105.

A layered set of database views 110, 112 into the database tables 105 is defined. They describe the virtual data model (VDM). As the top layer of the virtual data model, a collection of so called query views 110 are provided. They have been designed for the direct consumption through generic analytical user interfaces 130 (e.g. BOBJ, third Party) or via OData protocol through specific HTML5 user interfaces. Exposure of the query view via OData-Services is made via the XS Engine 120. In one embodiment, XS Engine is an SAP HANA component that deals with HTTP (S) requests as one of its application server features.

By evolving an in memory database to an in-memory data warehouse 100 without the need of an additional business warehouse server and ABAP server, a new paradigm of performance, agility and simplification is established. Query performance and data loading is exponentially faster, so complex reports and analysis that previously took hours or days can be available in minutes—or even seconds. The costly extraction, transformation, and loading processes are no longer necessary as business data is already stored in an in memory database server. Thus reporting on real-time data is enabled which is a fundamental improvement. As open standards like SQL are supported, the implementation of data warehouse reports is dramatically simplified. Furthermore, the elimination of one or more secondary server on which programming is executed, such as an application server or an ABAP server, reduces the total cost of ownership as administration effort is decreased and the system landscape is streamlined.

In memory database server 100 performs as a data warehouse. Abstraction of various business analytics results in operational, tactical, and strategic uses cases. In various examples, these three use cases illustrate requirements of some embodiments. Analytic services 115 and query views 110, 112 may be used to satisfy requirements for these use cases.

Operational use cases support day-to-day business decisions. Operational reporting is about enabling the business to do their daily work by providing detailed and real-time information on customer's processes. One use case focuses on collecting transactional data in order to enhance operational efficiencies. Operational reporting covers all business processes within a company (e.g. financial, material management, sales or purchase) and is subject to constant additions, updates, and deletions.

Operational reports are used by people with responsibility for improving operations. They provide task-oriented line-item information on individual transactions at very granular levels of detail for operational management. The reports usually rely on data from one business application such as a single Enterprise Resource Planning (ERP) system deployed to support North America financial processes. Reports cover a shorter time frame in comparison to other use cases. Examples include: List of open orders, material on stock, education cost in a profit center etc. Operational reports are commonly run on transactional systems as opposed to being run on a data warehouse-type of system, and operational reports typically involve current and short-term history.

Tactical reports are run by business professionals with little or no technical experience. The business professionals want to use analytical applications to drill down and through multidimensional objects. They rely on architects to build commonly used data objects for their work. This use case may combine data from multiple operational systems or store attributes that are not resident in the operational system since they are not required for operational processing. The use case includes historical data and structures, prepares and consolidates the data for multidimensional usage. In short, tactical reports may put operational data into a business context for business users. It also may require complex data analysis or even predictive analytics including past trends. Tactical reports are intended for monitoring and responding quickly to a variety of short-term situations and typically do not have hard requirements for real time data. The reported data is stable over a certain period so that results are consistent across reports from a variety of perspectives for the analysis duration. Examples may include Days Sales Outstanding (DSO), Working Capital Management (WCM), Liquidity forecast etc. While some tactical reports may be run on a transactional system, many involve medium-term to long-term history, and are more effectively run on a data warehouse-type of system.

Strategic reporting mainly serves business management personnel, who demand pre-consolidated and deeper structured and aggregated data as more detailed data usually delivered in tactical reporting. There is rarely a need for detailed information except when a root-cause analysis is desired. Strategic reporting summarizes and structures business key performance indicators (KPIs) to support strategy decisions. Strategic reporting includes a historic view and covers longer periods, combining data of an entire organization to provide a more holistic overview over an organizational state. Strategic reporting also typically focuses on what will or might happen and generally relies on historical data to predict the future. As such, strategic reports are more effectively run on a data warehouse-type of system.

In one embodiment, a defined architecture for the in memory data warehouse 100 is suitable for running all operational, tactical, and strategic reports, and may provide one or more of the following key business objectives and guiding principle listed below.

Reduced total cost of ownership: With in-memory data management concepts, the analytical capabilities may be directly incorporated into the operational systems. Enterprise systems become less complex and easier to maintain, resulting in less hardware maintenance and IT resource requirements.

Innovative applications: In-memory data management combines high-volume transactions with analytics in the operational system. Planning, forecasting, pricing optimization, and other processes can be dramatically improved and supported with new applications that were not possible before.

Better and faster decisions: In-memory enterprise systems allow quick and easy access to information that decision makers need, providing them with new ways to look at the business. Simulation, what-if analyses, and planning can be performed interactively on operational data. Relevant information is instantly accessible and the reliance on IT resources is reduced. Collaboration within and across organizations is simplified and fostered. This can lead to a much more dynamic management style where problems can be dealt with as they happen. Rules may be implemented to monitor operational changes and events that may trigger report or other document generation, broadcasting, and notifications in real-time. Further, planning and simulation may be performed and updated with very current data, either in real-time or on a recurring basis. Leveraging these characteristics facilitates very agile tactical and strategic business monitoring and decision-making.

Guiding Principles for some embodiments may include the right place for data processing: The more data processed during a single operation; the closer the operation should be executed to the database. Processing operations like aggregations should be executed in the database while single record operations should be part of a next layer or layers. This reduces system and network overhead and reduces latency, as less data needs to be communicated between storage and processing systems.

In one embodiment, system 100 may be easily adapted to newer versions and allow incremental addition of new features. Unnecessary generalization may be avoided as generalizations often decrease performance and worsen consumption.

In a side-by-side deployment model, where an application server utilizing a standard database is used for some if not most transactions and system 100 provides analytics and warehouse functions, the database tables 105 come into system 100 via replication from the application system, for which e.g. SLT (SAP Landscape Transformation) server can be used. For the integrated deployment option as shown in FIG. 100, the database tables 105 may be used directly.

Returning now to more specific information with regard to FIG. 1A, a layered set of database views is defined. They describe the virtual data model on top of the application database tables. At a top layer of the virtual data model, a collection of query views 110, which may also be referred to as views, are provided. Query views 110 have been designed for the direct consumption through generic analytical user interfaces (e.g. BOBJ, 3rd Party) or via OData protocol through specific HTML5 user interfaces. Exposure of the query view 110 via OData-Services may be provided via the XS Engine. The XS Engine is an SAP HANA component that deals with HTTP(S) requests as one of its application server features. In other embodiments, a different application server may be deployed to the in memory data warehouse system 100.

The building block Analytic Services 115 provide capabilities for implementing analytical use cases. Supportive services such as lifecycle management 146, monitoring and administration 144, and security 142 may be provided. Besides core analytic functions, additional functionalities may be provided by other supportive services such as calculation and aggregation engine 132, advanced analytic capabilities like hierarchy handling and history management 134, planning and simulation functions 136, predictive analysis 138, cross-system analytics 140, and broadcast and documents services 148. Such services may be included in various embodiments to implement more sophisticated analytical use cases. These analytic services are explained in the following.

Within system 100, there are several engines represented at 120 that run on processors that ensure queries and calculations can be handled. A planning engine 136 is provided to run planning functions, an MDX processor for MDX statements, a calculation engine 132 for calculation tasks on key figures or for the execution of stored procedures, and a SQL processor to handle SQL statements. The calculation engine 132 plays a role in query execution. The calculation engine 132 not only handles queries but also stored procedures and calculation operators to realize the data flow. The calculation engine 132 serves as a common execution runtime for Calculation Views, SQL SCRIPT, MDX queries, and Planning and Simulation Engine 136 operations. All these can be seen as domain-specific programming models that are translated into a common representation referred to as a "calculation model" which is executed on the database. Once the different artifacts are translated into this unified model, they are uniformly processed by the calculation engine 132. The calculation engine 132 may also have a predefined set of operators called an Application Function Library (AFL) which can be extended by custom operators.

In one embodiment, historical handling of data is performed by the history and hierarchy handling engine 134. Historical data corresponds to past-period information, usually used for analytics, legal reasons, or root cause analysis. In analytics, historic data are used to analyze time series of data over a longer period to provide, for example, trending or forecasting. Historical data is generally storable and accessible without severely affecting system performance. Consumption of historical data, in typical embodiments, is simple and based on open standards like SQL. Further detail regarding the history and hierarchy handling engine 134 is provided below.

Hierarchy handing is performed at by the history and hierarchy handling engine 134 in one embodiment. Hierarchies are used to structure and define relationships between attributes. End users often want to drill down and view their reports along hierarchies. Many business queries process hierarchical data. Frequently, a query contains a time aspect that is composed of well-known hierarchies of, for example, years, quarters, months, and days. Other examples are regions or countries, organizational units, profit centers, and product groups. Not all hierarchies can be transformed into uniform hierarchies, but may be irregular hierarchies, such as, organizational hierarchies that contain different roles on the same layer. The hierarchical structure may be time dependent. Considering an organizational hierarchy example, the monthly sales report of a sales unit should reflect the organizational changes in the unit, for example, employees switching positions. Hierarchies, such as organizational hierarchies, can change frequently, and in many cases, a record of these changes is needed for historical snapshot reporting. Exposed models that consist of attributes in hierarchies simplify analytics. Usually at least level (e.g. organizational structures) and parent/child hierarchies (e.g. bill of materials) are included.

Planning and simulation 136 may be performed to address needs to foresee the future of a business. Planning and simulation 136 generally does not deal with actual business transactions but predicts transactions of the future. The basic premise for business planning is to create plan data either manually or automatically. Planners have to develop the information and understand the objectives of the corporation and the overall business environment to make sure a developed business plan is achievable and will move the company toward a successful result. Plans from different areas are often highly interrelated, e.g., a sales plan provides the basis for a production plan. Because of this interrelation, the creation of the plans for different areas typically follows a strict schedule in the company. Consequently, support for steering and monitoring the whole planning process across the different planning areas is typically needed. Reacting to changes in the context of a business plan often demands rapid generation of results, quick re-planning and re-budgeting, and coordinated and swift implementation of new budgets and plans across highly complex organizations.

Plan data in typical embodiments is separated from the actual data, however for analytical processing; the plan data is accessible just like actual data, especially to facilitate actual-plan comparisons. One operation in planning is distribution. This operation is used to distribute values from a coarse aggregation level down to a detailed aggregation level, e.g., distribute planed sales revenue for Europe down to countries. The aim of some planning embodiments is to improve planning, consolidation and simulation frequency, accuracy, and effectiveness to reduce planning-cycle times and costs.

Cross-system analytics 140 may be provided in some embodiments to consolidate, transform and clean data from different data sources and in a consequence, provide a central and consistent view for reporting and analyzing data within a company. To provide a holistic overview of the company's situation, data originating from various source systems may need to be harmonized or normalized and combined throughout the whole company. When data is replicated from several source system it is very likely that the data does not fit together from a business or technical context. A simple example is master data, such as cost centers. The same cost center key can exist in multiple source systems with different cost centers assigned. When the data is replicated into an in memory database, also operating as an in memory data warehouse, functionality may be provided in the cross-system analytics 140 of some embodiments to bring the different data sets together and to create one common data foundation. Besides transformation, data consistency should be ensured. For example different releases of source systems should be managed, replication dependencies (e.g. master-detail) have to considered or separation of data from different source systems have to be supported. On top of that it is also necessary to monitor the logic and flow of data replicated from various systems, including systems running applications of different vendors. Further detail regarding cross-system analytics is provided below.

Predictive analysis 138 encompasses a variety of statistical techniques and data mining solution that enables building predictive models and visually interact with the data to discover hidden insights and relationships in data, and thereby provide the basis for making predictions about future events. Examples for such statistical methods are descriptive models which classify customers or prospects into groups, decision models which predict the results of decisions involving many variables and the predictive model itself which is analyzing historical data to assess how likely a specific behavior is to occur. These models can be implemented to implement several predictive analysis functions.

Forecasting, as may be performed in some embodiments by the predictive analysis 138 service involves answering questions such as "How do historical sales, costs, key performance metrics, and so on, translate to future performance?" "How do predicted results compare with goals?" Key Influencers identify the main influencers of customer satisfaction, customer churn, employee turnover, and so on, that impact success. Trends provide historical or emerging, sudden step changes, and unusual numeric values that impact the business. Relationships identify correlations in the data, such as cross-sell and up-sell opportunities. Anomalies might exist and conversely groupings or clusters are identifiable that might exist for specific analysis.

Figure 1B:
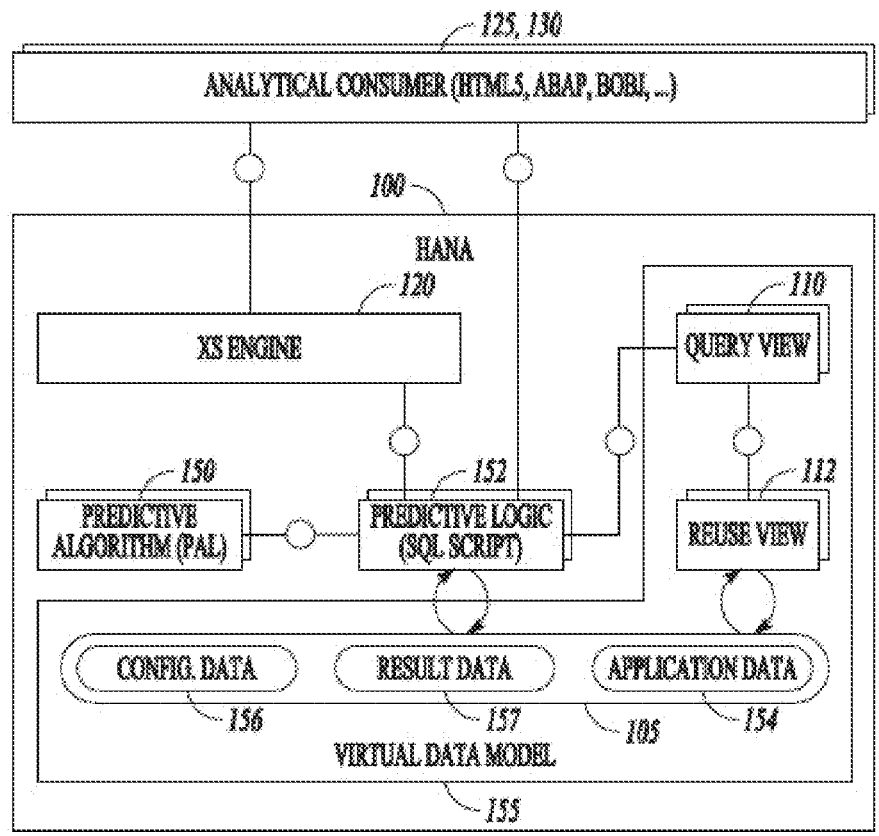
FIG. 1B is a block diagram illustrating integration of predictive analysis functions into an in memory data warehouse according to an example embodiment.

Predictive analytics, as included in the predictive analysis 138 service, may involve processing high data volumes. Statistical and data mining algorithms used in such analytics are usually very performance intensive due to the high data volumes. In one embodiment, data is processed in the database, closer to the data, to improve performance. In one embodiment, system 100 is provided with a PAL (Predictive Analysis Library), which is an application function library that offers statistical and data mining algorithms. In addition, specific algorithms can be implemented when desired. As shown in block diagram form in FIG. 1B with like reference numbers for like parts in FIG. 1A, statistical and data mining algorithms 150 may be invoked and orchestrated by implementing SQL SCRIPT code 152. Containers for this coding can be scripted views or procedures.

The statistical and data mining algorithms utilize application data 154 as input for computations. A virtual data model 155 with its query views 110 are used for this purpose. Thus, a simple and standard access mechanism is reused. If existing query views are not sufficient to read needed input data, standard SQL techniques can be used to enhance the existing query views or to define new query views. Usually the algorithms also require configuration parameters, e.g., the maximum number of clusters for a clustering algorithm. Those configuration parameters may be stored in specific tables as configuration data 156 and encapsulated with query views. Depending on the execution time of the algorithms, the results 157 can be provided to the user interface 125, 130 immediately or may be stored in the database as indicated by result data 157. In the second case, again query views may be offered to expose the stored result data 157. The predictive logic and the according control/result data can be triggered from UI directly or using the XS Engine 120 (web server inside system 100, such as SAP HANA). In the second case, according OData (output data) services may be provided so that the access with HTTP protocol is supported.

The virtual data model concept is reused for input, control and result data. Therefore all solutions for the typical challenges may be inherited, e.g., security, enhancement, performance, or access from UI. Thus, no new concepts are required but existing concepts are enhanced. This results in simple and powerful solution architecture and allows for simplified development and maintenance.

Figure 1C:
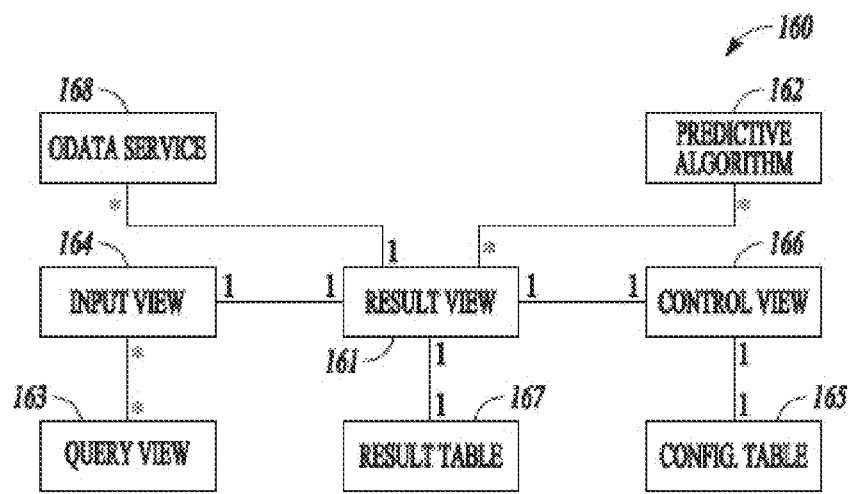
FIG. 1C is block diagram illustrating a metal model for predictive analysis according to an example embodiment.

FIG. 1C illustrates a meta model 160 for the described architecture. One of the main entities is a scripted result view 161 where the orchestration and invocation of the predictive algorithms 162 are implemented. In one embodiment, programming language SQL SCRIPT is used. For an input parameter of the algorithms, a query view 163 may be directly utilized or new input views 164 may be defined for this purpose. A control parameter for the algorithms may be stored in tables 165 and exposed with views such as control view 166. The results can be stored in a table 167 or provided to the user interface immediately. To consume the results from UI via HTTP protocol, OData services 168 are offered.

In the following section, the above-described approach is shown with some example coding. An inventory management use case is chosen to illustrate a prediction for planned goods issue by calendar week for a material. The prediction is a forecast is illustrated in graph form in FIG. 1D, where calendar week CW is illustrated on one axis with millions of dollars shown on the other axis. The forecast is shown as a portion of line 170 extending beyond calendar week three. Goods received is shown at line 172 showing two larger receipts of goods at weeks 50 and 2.

As an example statistical algorithm, a triple exponential smoothing is chosen. Much of the coding would look similar for other algorithms. FIG. 1E illustrates example SQL SCRIPT coding at 180 that invokes the triple exponential smoothing function.

As the algorithm expects data in a certain format and order, the input data is prepared at lines 4 to 11 as indicated at 181. The query view MICMATLGRGILEVELQUERY is directly called at 182 to read the input data. The control parameters of the algorithm are stored in the database and read into the variable lt_ctrl (line 14 at 183). The triple exponential smoothing algorithm is called at 184 with the input and control parameters. It returns the results in the variable lt_out (line 17 at 185). Those results are assigned to the view's output structure var_out at 186. Thus, the results can also be accessed by using standard SQL.

To invoke the above defined scripted view by an HTML5 UI using HTTP protocol an OData service can be defined as following:

```
service {
    "tmp.aflpoc::GIFORECASTCP" as "GOODSFORECASTCP"
    keys generate
    local "GenID" parameters via entity "GIFCCPQuery";
}
```

In the following, some best practices, or rules of thumb, are outlined when implementing applications with predictive analytics capabilities. It is not claimed that this list of recommendations are complete, nor explicitly required in all embodiments.

Statistical and data mining algorithms should be processed in the database. In predictive analytics, high data volumes are often processed. Therefore the according statistical and data mining algorithms are usually very performance intensive.

Predictive Analysis Library (PAL) should be used. Background: SAP HANA is provided with PAL as an application function library that offers statistical and data mining algorithms. Those algorithms may be implemented in C++, are executed in the database kernel, and are therefore optimized for high performance.

If PAL does not provide a needed statistical and data mining method, custom algorithms may be implemented using the application function library (AFL) approach. With the AFL approach, algorithms can be implemented in C++ and executed in the database kernel. Thus, high processing performance can be achieved.

Predictive logic, namely the invocation and orchestration of the statistical and data mining algorithms, may be implemented in SQL SCRIPT.

Scripted calculation views may be used for the implementation the predictive logic, such as when the computed results are not to be persisted.

Procedures may be used for the implementation of the predictive logic, such as when the computed results are to be persisted. A query view should be provided for the stored results. In some embodiments, a write operation is only supported by procedures.

For the input data of the algorithms, existing query views may be utilized. If this is not sufficient, new query views may be defined.

Control parameters for the algorithms may be stored. A query view may be provided for the stored control parameters.

For the result data and control parameter, separate OData services may be provided.

The purpose of predictive analytics is to encompass a variety of statistical techniques and data mining solutions that enable building predictive models and visual interaction with the data to discover hidden insights and relationships in data, and thereby provide the basis for making predictions about future events. Examples for such statistical methods are descriptive models which classify customers or prospects into groups, decision models which predict the results of decisions involving many variables and the predictive model itself which is analyzing historical data to assess how likely a specific behavior is to expect. These models are used to implement forecasting, key influencers, trends, relationships or anomalies.

The virtual data model concept is reused for input, control and result data. Therefore all solutions for the typical challenges are inherited, e.g. security, enhancement, performance or access from UI. Thus, no new concepts are required but existing concepts are enhanced. This results in a simple and powerful solution architecture.

By evolving an in memory database system to an in-memory data warehouse without the need of an additional business warehouse respectively, system 100 provides a new paradigm of performance, agility, and simplification. Query performance and data loading is exponentially faster such that complex reports and analysis that previously may have taken hours or days to generate can now be available in minutes—or even seconds. The costly, time consuming extraction, transformation, and loading processes are no more necessary as the business data is already stored in an in memory database. Thus reporting on real-time data is enabled which is a fundamental improvement. As open standards such as SQL are supported, the implementation for data warehouse reports is dramatically simplified. Furthermore, the elimination of a separate application server, such as an ABAP server, on which data is processed, reduces total cost of ownership as administration effort is decreased and the system landscape is streamlined.

Handling of predictive analytics is one of the core capabilities of an in-memory data warehouse. This feature allows companies to uncover hidden customer, product, service, employee, vendor, and partner trends and insights. They can anticipate behavior and take proactive action. Companies can empower their team with intelligent next steps to exceed customer expectations. Companies can create new, intelligently tailored offers to increase market share and profitability. Corporations can develop and execute a customer-centric strategy to target the right offers to the right customers through the best channels at the most opportune time.

The in memory data warehouse 100 provides an environment where customers can build models directly in the database to run analysis on the historical transactional data. Broadcast and documents services 148 makes reports available to a wide spectrum of users, according to their requirements. Analytic results may be distributed by mail as pre-calculated documents or as links. The recipients receive (for example, automatically upon data change or on a scheduled basis) the pre-calculated documents in their email or portal inboxes and can use the business data to make decisions or trigger processes. Those analytic results can also be published to a portal, which serves as the central entry point for employees in the company. Another method is to publish a query with a link (e.g., a Universal Resource Identifier "URI", Universal Resource Locator "URL", and the like) that triggers generation of the report or other document. The distribution can be scheduled periodically (e.g. every month or each quarter) or be based on events (e.g. new sales data available or unusual sales figures).

In some embodiments, broadcast and documents services 148 may be configured by developers, administrators, and even by some users. The broadcast and documents services 148 may be configured to define reports that may be accessed by the same or other users via one or both of the specific analytical user interface 125, the generic analytical user interface 130, and other user interfaces that may be present or otherwise utilized in some embodiments. For example, while some embodiments may operate to present a defined report in a thin or thick client app or application. In other embodiments, a report may be accessed via a web interface as may be presented within a web browser. In further embodiments, a report may be viewed and manipulated within another application, such as EXCEL® available from Microsoft Corporation of Redmond, Wash. In yet other embodiments, reports may be generated in a document format, such as a page description language document format (i.e., the Portable Document Format (PDF)), a word processing format, presentation document format, an email, or other document type.

When a report is defined, not only are one or more output types defined, but a distribution medium and report makeup are also defined. The distribution medium may be in the form of an email or text-based message to which a copy of the report is attached, referenced by a link as discussed above or text that indicates the report is available via another report viewing means, such as a portal, app or application, and the like.

The report make up, when defined, identifies data to be included in the report. Generally, such a report is defined to be generated through execution of instructions within the XS engine 120 in a manner that leverages the analytic services 115 of the in memory data warehouse 100, including the broadcast and documents service 148. A report definition also will generally reference at least some database table 105 data to be included in the report that is to be obtained via query views 110 and reuse views 112. The report may be a simple report, but in most instances, the report will be at least somewhat complex, including data that is derived by one or more of the analytic servicers 115.

The report make up will also include a trigger, such as one or more defined data events that will be monitored by a service of the broadcast and documents services 148. When the data event occurs, such as an increase or decrease in sales or production volume, the report will be generated and distributed or notifications sent. When the report is generated, it may be stored as a query view 110, as a document on a server, or the report may simply be generated on demand when accessed following transmission of the notification.

In some such embodiments including the broadcast and documents services 148, the VDM is a pillar of the supporting system architecture. On top of application tables, database 105 query views 110 are defined in order to hide the complexity of the data model and to transform the technical oriented tables into a business focused semantic. For example, several application tables from order-to-cash process are combined to a view representing the business object sales order. Thus, consumption by an analytics consumer is simplified.

Broadcast and documents services 148 may be provided by XS Engine 120. In such an integrated option, all broadcast and documents functionality is implemented in XS Engine 120, which as discussed above is a web server inside SAP HANA. In addition, a side-by-side option may be supported, as discussed elsewhere herein.

The integrated XS Engine 120 option can reduce TCO as no additional server is required. Furthermore, this is generally a more powerful solution due to the tight integration into processing engine of the in memory data warehouse system 100. For example, triggering alerts when thresholds are exceeded or the underlying data is changed can be integrated in such embodiments into the data update processes of the in memory data warehouse 100. This allows for real-time alerting compared to a batch process based approach. In the context of publishing personalized analytics, results may be distributed to a mass audience. Compared to the side-by-side option, no data must be exchanged between servers n such embodiments which improves performance dramatically.

However, the side-by-side option may be beneficial when one broadcast and documents server is utilized instead of the integrated broadcast and documents services 148, and is shared among several analytics servers. Such embodiments may reduce cost and improve TCO. For example, an SAP HANA instance with the integrated broadcast and documents capability may be used as the side-by-side server. However, third party servers for broadcast and documents may also be used to increase flexibility for customers.

Further details of the broadcast and documents services 148 of some embodiments are included below with regard to FIG. 4.

Returning to FIG. 1A, security module 142 involves various security aspects. In one embodiment, the following dimensions may be addressed:

Authentication—Authentication is the process of determining whether someone or something is, in fact, who or what it is declared to be (Who are you? Can you prove it?) For connecting to the database, the in memory data warehouse 100 supports external and internal authentication. External authentication is using standard authentication protocols like Kerberos or SAML. Kerberos is a standardized service for authentication in networks. The client connects to the Kerberos server to authenticate the user and to get an authentication ticket that proves the user's identity to the database, such as an SAP HANA database. With internal authentication, users are authenticated by the database using the database username and password.

Authorization—Authorization is the process of giving someone permission ("to allow") to do or have something but also checking of the permission values when a user is getting access (Which permissions shall be given? What are you allowed to do?)

System Privileged—System privileges are used in the in memory data warehouse to perform system level operations or administrative tasks such as creating and deleting database schemas, managing users and roles, administration of monitoring and tracing, performing backup and restore operations, and so on.

Object Privileges—Object privileges allow performing specified actions on specified database objects. Users and roles may be created and data object and function access may be granted. Rights may also be granted to specific data values. For example, User A is authorized to access customer A while user B is only authorized to access customer B.

Confidentiality—Confidentiality is a set of rules or a promise that limits access or places restrictions on certain types of information (Who is able to read this message?).

Secure Storage—Secure storage is one aspect that has to be ensured regarding confidentiality. Sensitive data (e.g. credit card numbers) should be stored in encrypted form. In such embodiments, an encryption and decryption mechanism is required. Data encryption may be provided by respective operating system or storage provider in some embodiments, or may be integrated into system 100 in further embodiments.

Auditing—Auditing is the process to verify, independently, the quality and integrity of the work that has been undertaken within a particular area, with reference to legally accepted procedures (Which user changed data? What legal requirements have to be fulfilled?). Auditing may provide for traceability of actions performed in the system 100. Security logging and tracing may be supported using operating system log files. Audit policies and trails may be specified based on those data. Audit policies define which events to audit. Each policy has a name and can be enabled or disabled by an administrator having the according privilege. Audit policies are not dropped when the creating user is removed. The policy has several further attributes, which are used to narrow the number of events that are audited.

Data Privacy and Protection—Data privacy and protection may also be provided. Personal data should be deleted if there is no purpose to keep it. Deletion should not destroy referential integrity between objects and have to consider all defined retention periods. Read logging for sensible data may also be ensured.

Application Lifecycle Management 146—Application Lifecycle Management 146 covers capabilities to support the lifecycle of system 100 based applications. It is about functionality to move configuration changes between different data warehouse instances to keep productive systems in sync with quality or development systems. Lifecycle management may also be used for updating the data warehouse by applying new revisions levels or support packages. If new revisions or versions are implemented the system needs to be able to identify which views were extended by the customer and ask which version to keep in the future. Aspects of design time tools, supportability, maintainability or archiving are also considered in the context of application lifecycle management. Customers should be able to use a consistent set of tools for working with the in memory data warehouse. The tools should eliminate all significant hurdles for the adoptions of content and thereby help to reduce total cost of operation for customers. Specific tool support is especially required for identification of relevant database views, extensibility, consistency checks or field name catalog.

Administration and monitoring—Administration and monitoring may be provided at 144. For operational usage monitoring, tracing and troubleshooting capabilities have to be provided. For example, the administrator has to be informed regarding critical situations and according solutions by an alert framework. For monitoring query performance statistics, visualization tools may be provided. These administrating and monitoring tasks in one embodiment cover all schemas and tables in the database. A statistics server is a framework for monitoring and proactive alerting that provides the following:

Polls important system parameters in regular intervals;
Performs checks based on customizable thresholds;
Alerts displayed to users;
E-mail alerting; and
Integration with central life cycle management tools like SAP Solution Manager.

Figure 2:
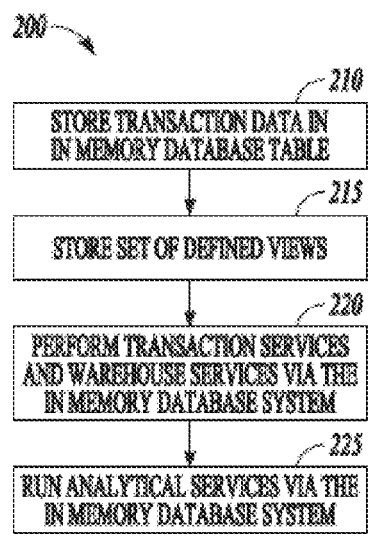
FIG. 2 is a flowchart illustrating a method of using an in memory data ware house system to perform transaction and warehouse functions according to an example embodiment.

Traditional database management systems are designed for optimizing performance on hardware with constrained main memory. Disk I/O is the main bottleneck. In one embodiment, the system may be designed from the ground up around the idea of in-memory processing and column-based storage option. System 100 combines transactional and analytical processing. FIG. 2 is a method 200 of using system 100 to perform transaction and warehouse functions according to an example embodiment. At 210, system 100 stores transaction related data in the in memory database table on random access computer readable memory. At 215, a set of defined views is stored in computer readable memory over the database table. At 220, the system performs transaction services and data warehouse services via the in memory database system. At 225, analytical services are run on the database table via the in memory database system.

In some embodiments, an interface is provided to interact with users and provide access to the engine, analytical services, and views to perform transactions and data warehouse functions on the database table. The user interface may include a specific analytical user interface utilizing HTML, and a generic analytical user interface utilizing SQL. The defined views may include query views and reuse views. The analytical services in some embodiments include a calculation and aggregation engine. In further embodiments, the analytical services include a predictive analysis services, a history and hierarchy handling services, cross system analytics services, security services, and planning and simulation services.

Further detail is now provided regarding managing and providing access to historical data. In an optional side-by-side deployment model, the database tables 105 come into system 100 via replication from application systems, for which an SLT (SAP Landscape Transformation) server or other server may be used. For the integrated deployment option, the database tables of the application are used directly.

Historical data are past-periods information, usually used for analytics, legal reasons or root cause analysis. In analytics, historic data are used to analyze time series of data over a longer time horizon in order to provide for example trending or forecasting. Historical data must be storable and accessible in system 100 without severely affecting the performance of the system. Consumption of historical data should be simple and based on open standards like SQL.

In the context of analytics, at least three challenges are to be considered. First, not all application data are time-dependent, thus validity periods or timestamps may not maintained and stored in the database. Second, keeping historical application data for which no time-dependent data is maintained increases the demand for additional hardware and performance requirements. Third, customers usually archive data on a regular basis to avoid performance gaps and save hardware costs. Archiving results in deletion of data from operational systems and moving them to an archive store.

Time dependent data having a validity period may be stored with maintained validity periods in some embodiments. Usually transactional data in applications contain validity periods or timestamps. This is also true for various master data, e.g., all business objects in a Human Capital Management (HCM) application are stored with validity periods in the database. In case of time-dependent data, all record updates usually result in adjusting of the validity periods. For this category of time-dependent data, views may be provided exposing the history. Consumers of those views would be enabled to time travel and retrieve data that was valid at a certain point in time by filtering the data based on the valid from and valid to information.

Time dependent data without validity periods may be stored without maintained validity periods in other embodiments. Application data exits that is relevant for analytics in terms of time travel queries. However, for such data the according time-dependent aspects are typically not available in the operational database. One solution for facing this issue is the identification of the relevant tables and enhancement of those with regard to time-dependency.

Another solution of some embodiments is with regard to change documents and logs for the according business objects resp. processes and to derive time-dependent information therefrom. Again views may be defined in such embodiments based such data in order to expose historical aspects.

Figure 3:
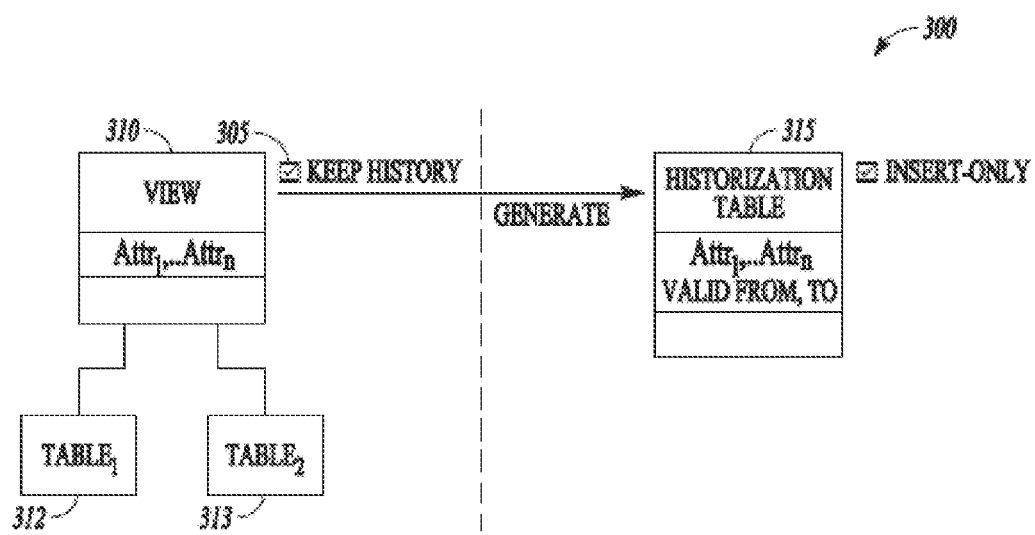
FIG. 3 is a block diagram of a history tracking mechanism according to an example embodiment.

Another solution to historical data issues is to use a virtual data model layer in order to enrich application data with time-dependent information. FIG. 3 is a block diagram illustrating a mechanism 300 for keeping track of historical data. A flag, keep history 305, is provided as an additional property for virtual data management (VDM) views 310 based on one or more tables 312, 313. Activation of the flag 305 results in generation of a shadow table 315 with the same structure as the according VDM view 310. Shadow table 315 may also be referred to as a history or historization table. In order to keep history information the shadow table 315 should be flagged insert-only.

Figure 4:
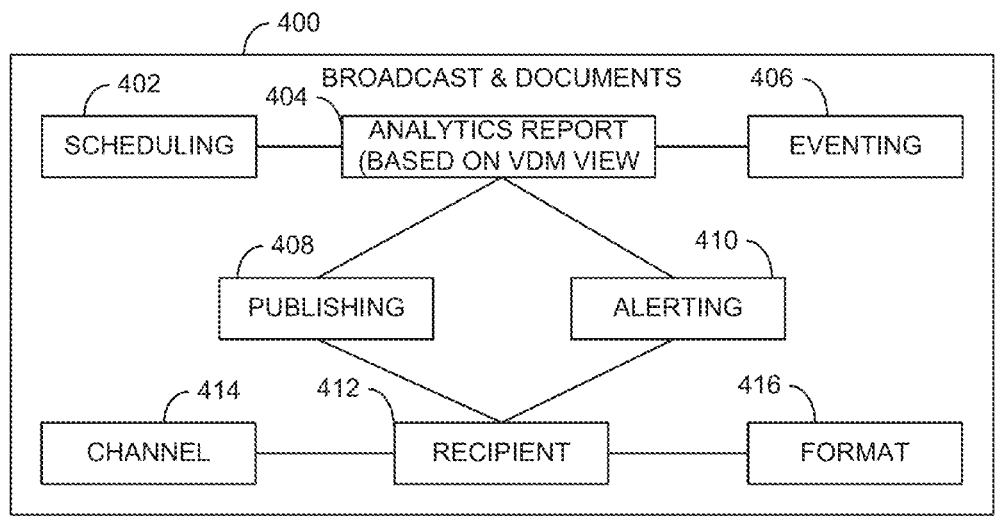
FIG. 4 is a logical block diagram of broadcast and documents services, according to an example embodiment.

FIG. 4 is a logical block diagram of broadcast and documents services 400, according to an example embodiment. The broadcast and documents services 400 are an example of the broadcast and documents services 148 of FIG. 1A, according to some embodiments.

The details of the broadcast and document services 400, according to some embodiments, are illustrated and described with regard to FIG. 4. Broadcast and documents services are built upon defined analytics reports 404 that are defined to leverage VDM views. An analytics report 404, when fully defined, includes configuration settings with regard to various functions and parameters of the broadcast and documents services 400. These functions and parameters include scheduling 402, eventing 406, publishing 408, alerting 410, recipient 412, channel 414, and format 416.

Scheduling 402 is a process which allows running an analytics report 404 automatically at specified times. To schedule an analytics report 404, a recurrence pattern is defined with regard to the report. Thus, additional parameters can be specified in order to control exactly when and how often the analytics report 404 will be run. When an analytics report 404 is scheduled, the system may create a scheduled instance that contains only object and schedule information. However, it may not otherwise contain any data. When the system runs the object, such as within the XS engine 120 of FIG. 1A, the system creates an output instance for the analytics report 404. A report instance contains actual data from the database.

Events are objects that represent occurrences in the system. Eventing can be used for scheduling or alerting 410. Event-based scheduling provides additional control in terms of setting up events so that analytics reports 404 are processed only after a specified event occurs. The eventing 406 component, in some embodiments, supports capabilities including event handling, event notification, firing events, or configuring events.

Alerts notify users and administrators when events are triggered, e.g., the threshold for a measure was exceeded. An alert contains user-requested content such as a reminder (important), a notification (urgent), and ultimately an alert (important and urgent). The alerting 410 component, in some embodiments, supports features to enable alerts, subscribing to alerts, alert notification, unsubscribing from alerts, and alerting workflows.

Publishing 408 provides documents containing results of analytics reports 404 and makes them available automatically via email or file server. A publication is a collection of documents intended for distribution to an audience (i.e., one or more people). Before the documents are distributed, the publisher defines the publication using a collection of metadata. This metadata includes the publication source, its recipients 412, and the personalization applied. Publications help sending information through organizations more efficiently. They shall allow distribution of information to individuals or groups of users and personalize the information each user or group receives. They shall provide delivery of targeted business information to groups or individuals through a password-protected portal, across an intranet, an extranet, or the Internet. They shall minimize database access by eliminating the need for users to send process requests themselves. During Publishing 408, the data in documents is refreshed against data sources and personalized before the publication is delivered to recipients 412. This combined process is known as report bursting. Depending on the size of the publication and how many recipients 412 it is intended for, several report bursting methods can be applied, e.g. one database fetch for all recipients 412 or one database fetch for each recipient. Delivery rules must be supported. These affect how documents in publications are processed and distributed. When delivery rules are set on documents, it is indicated that the publication will be delivered to recipients 412 only if the content in the documents meets certain conditions.

Recipients 412 are the distribution targets for analytics reports 404. These can be natural persons or organizations receiving analytics reports 404 but also locations where analytics reports 404 are stored. For recipients details shall be maintainable, e.g. mail address. Furthermore distribution channel 414 (e.g. SMTP for mail or FTP for file) and format 416 (e.g. PDF or MICROSOFT® Word®) shall be specifiable.

When an analytics report 404 is defined within the broadcast and documents services 400, the scheduling 402, eventing 406, publishing 408, alerting 410, recipient 412, channel 414, and format 416 functions and parameters may be configured via one or more user interfaces accessible via the XS engine or other server.

Figure 5:
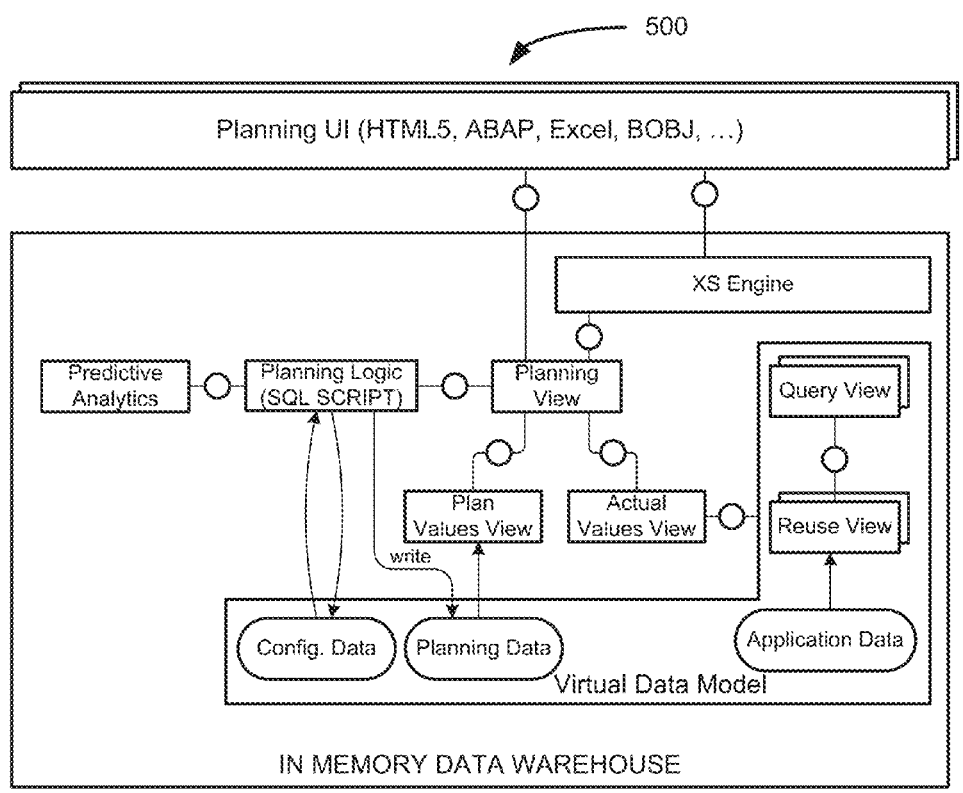
FIG. 5 illustrates a segment of a system 500 architecture, according to an example embodiment.

Turning now to planning and simulation functionality included in some embodiments, FIG. 5 illustrates a segment of a system 500 architecture, according to an example embodiment. The system 500 is illustrated with data flows and stored data elements that may be utilized in embodiments including planning and simulation functionality. Note however that the system 500, in some embodiments, may be the same as the system illustrated in FIG. 1A, differing only in how the system 500 may be implemented, utilized, or configured. There are two guiding principles upon which embodiments of the system 500 may be implemented for planning and simulation purposes. These principles are: 1) locate the planning and simulation functions in the in memory data warehouse; and 2) the planning and simulation framework is built upon a module service library architecture.

Common business pain points today include the fact that planning and forecasting cycles are too long and happen only on a fixed basis. System performance bottlenecks prevent planning at a detailed level. Delayed insight into information slows decision-making and corrective action. Various embodiments herein resolve such performance issues and support real-time and detailed planning by moving the planning functions and orchestration to the in memory data warehouse. This is the first architecture principle mentioned above.

Most available planning and simulation solutions are generic frameworks. They aim to enable experts to implement planning and simulation scenarios by configuring these frameworks. There are several drawbacks with such generic framework approach. First, such frameworks become very complex with the time, as more and more scenarios must be covered, resulting in new specialized features of the framework. Thus, the level of knowledge required to configure and handle the framework increases while the number of available experts decreases. Another issue is that the framework has to have the overall control flow, which makes breakouts nearly impossible. Conversely, this means that whenever a capability is missing to implement a specific scenario, only the framework provider can close the gap. This slows down the development process and results in artificial and complex workarounds for the framework consumers. Another pain point is that bugs in the framework are difficult for configurators to identify and resolve. Again, there is an unnecessary dependency to the framework owner, which makes the implementation process inflexible.

To solve these issues, a service library approach is included in some embodiments, which is the previously mentioned second architecture principle. The service library approach means to provide core planning services (e.g. managing of planning versions) for reuse and allow application developers to implement their specific scenarios using view modeling and SQL SCRIPT in the in memory data warehouse. The control flow is on the application side. This approach provides breakout per definition and reduces dependencies to a minimum.

The system 500 illustrates an example of such an architecture for planning and simulation. To accelerate planning and simulation cycle times the according logic is implemented in the in memory data warehouse. Views following the VDM concept, as discussed above, are leveraged. Thus, already established VDM concepts are reused, e.g., extensibility, authorization, UI integration or support of open standards. This provides a simple and powerful solution architecture.

In the system 500, actual data values are exposed by views. These views can be existing, enhanced, or new VDM views. For plan values, new tables may be created and encapsulated by VDM views. For the planning view, the underling plan and actual values views may be combined, such as with an SQL JOIN/UNION operator. The planning view, in some embodiments, contains all attributes for the planning and simulation application. If hierarchies are required in a particular embodiment, the hierarchies can be modeled based on the planning view. Further, an OData service can be defined for the planning view in order to implement specific UIs based on XS Engine. However the planning view may also be accessed using SQL/MDX/ODBC, e.g. for consumption by generic tools.

Figure 6:
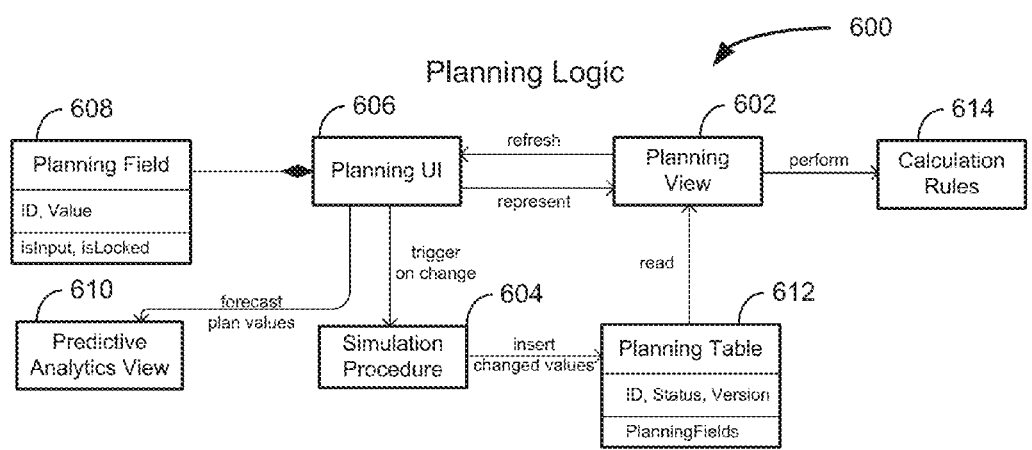
FIG. 6 is a block diagram illustrating planning and simulation data flows and logic implementations between various system components and stored data elements, according to an example embodiment.

FIG. 6 is a block diagram illustrating planning and simulation data flows and logic implementations between various system components and stored data elements, according to an example embodiment. In particular, FIG. 6 illustrates planning logic 600 flows within an in memory data warehouse as may be configured and executed within an XS engine through invocation of various analytic services, as discussed above, and including planning and simulation services 136 and other optional services as illustrated and described within regard to FIG. 1A.

The planning logic 600, as may be implemented though the planning and simulation services in some embodiments, invokes and orchestrates calculation rules for a planning and simulation process or application (e.g., disaggregation or KPIs). Predictive analytics capabilities can be integrated within the in memory data warehouse, but may also be implemented in a side-by-side embodiment as described elsewhere herein. Configuration data for the planning and simulation application can be stored in tables, such as database tables 105.

The planning logic 600 includes presenting a planning user interface 606 that may be provided to a user via a browser-based user interface, via an app or application, or otherwise be provided. Metadata 608 of a planning and simulation process may be presented and editable in user interface 606 fields for specifying data fields of a plan or simulation output that may be manipulated or locked, such as fields for plan data that are editable while actual data are just displayed. Default values for the plan data can be provided as input or derived through predictive analytics methods, such as by invoking planning and simulation services, calculation and aggregation engine services, predictive analytic services 610, cross-system analytic services, among others, and may be accessed via those services or obtained via VDM views. Thus, predictive algorithms and their forecasting results may also be encapsulated within VDM views allowing integration into the user interface, in some embodiments, through use of OData services or SQL/MDX/ODBC.

By specifying plan values, such as by input in the planning user interface 604 or by conditionally linking an input value to one or more stored or calculated data fields, a simulation and planning procedure may be triggered. This SQL SCRIPT procedure updates the planning table 612 with the plan values entered in the planning user interface 606. The simulation procedure 604 may also include preprocessing steps for calculation rules 614. In some embodiments, to generate the planning view 602 based on a planning and simulation application or process defined in the planning user interface 604, planning and simulation configuration data may be retrieved from the planning table 612 and a portion or all of the planning and simulation application or process may be executed. This execution may calculate KPIs, a larger plan, or a more simple metric. The results may then be stored, such as in the planning table 612 and the results may be output via the planning user interface 606, in a report, as defined within a broadcast and documents service 148, or otherwise.

Since planning and simulation process is performed for future periods, forecasting can help tremendously for future planning Predictive analytics, such as may be included in the predictive analysis services of some embodiments, may be used for generating planning data. A separate VDM calculation view may be provided to encapsulate statistical and data mining algorithm execution. Output of such a calculation view can act as initial input for a planning and simulation process. Such predictive analytics output assists the planner by providing more accurately forecasted values for inclusion in larger plans.

However, in some organizations, data entered into and forecast data added to a plan may be subject to approval by higher authority within an organization. Thus, some embodiments enable approval processes for obtaining approval or confirmation of plan data provided by a planner or simulation process. Some such embodiments include a workflow engine integrated within the in memory data warehouse. Defined approval workflows may be defined and followed in such embodiments. However, other embodiments may include approval processes defined and executed in a simpler manner. For example, the XS Engine provides an interface for sending emails, which can be used for sending notifications when planned data is released by a planner to alert interested parties. The notifications can be triggered in some embodiments based on configured broadcast and document services. Approval and rejection activities may then be handled via email or direct communication.

One challenge in deploying planning and simulation functionality to an in memory data warehouse is transaction management. The planning and simulation user interface 604 of FIG. 6 may update multiple tables in the in memory data warehouse as SQL provides the statements COMMIT, ROLLBACK, LOCK TABLE, and SET TRANSACTION to ensure transactional consistency. However, SQL scripting languages of some databases may not include explicit transaction statements. To address this, in memory data warehouse procedures may be treated as one transaction unit and may be configured to automatically roll back as a whole should any SQL statement in the script fails. In planning and simulation situations, this transaction management is typically sufficient because the number of users consuming planning and simulation applications is usually very small. Further, even if several planners using the same planning and simulation application, they are typically operating on different data sections (e.g., one user plans for Europe and another for Asia).

In more complicated situations, such as where multiple writable procedures are called and need to be treated as one transaction, transaction management can be achieved in a higher level, above views, such as in the XS Engine application layer.

Planning and simulation attributes are often organized in hierarchical order, such as a production forecast that may depend on or be an input for a sales forecast. Similarly, a sales forecast may provide an input for a revenue forecast. Leveled or parent-child hierarchies can be model in some embodiments to reflect such relations. Hierarchy operations (e.g. aggregation along a path) in graphical and scripted calculation views are provided in some embodiments to simplify visualization, development, and implementation of calculation rules in simulation and planning Hierarchies may be defined in metadata of defined and stored planning and simulation processes. This metadata maybe consumed by a user interface to generate a graphical rendering of the defined hierarchy.

As VDM calculation views are used to implement planning logic, VDM extensibility concepts also apply to planning and simulation in some embodiments. The VDM extensibility may be based on SQL features. For example, when an existing view is to be enhanced in terms of exposing new attributes, then a new view can be defined by joining the existing view with a table storing the additional attributes. For user interfaces implemented based on HTML5 and OData services, standard extensibility is available. When a planning output is provided in another format, such as a format renderable in the spreadsheet program for rendering, the user interface is somewhat generic and is extensible by default requiring no specific extension be applied. An example of a planning output is illustrated and described with regard to FIG. 7.

Figure 7:
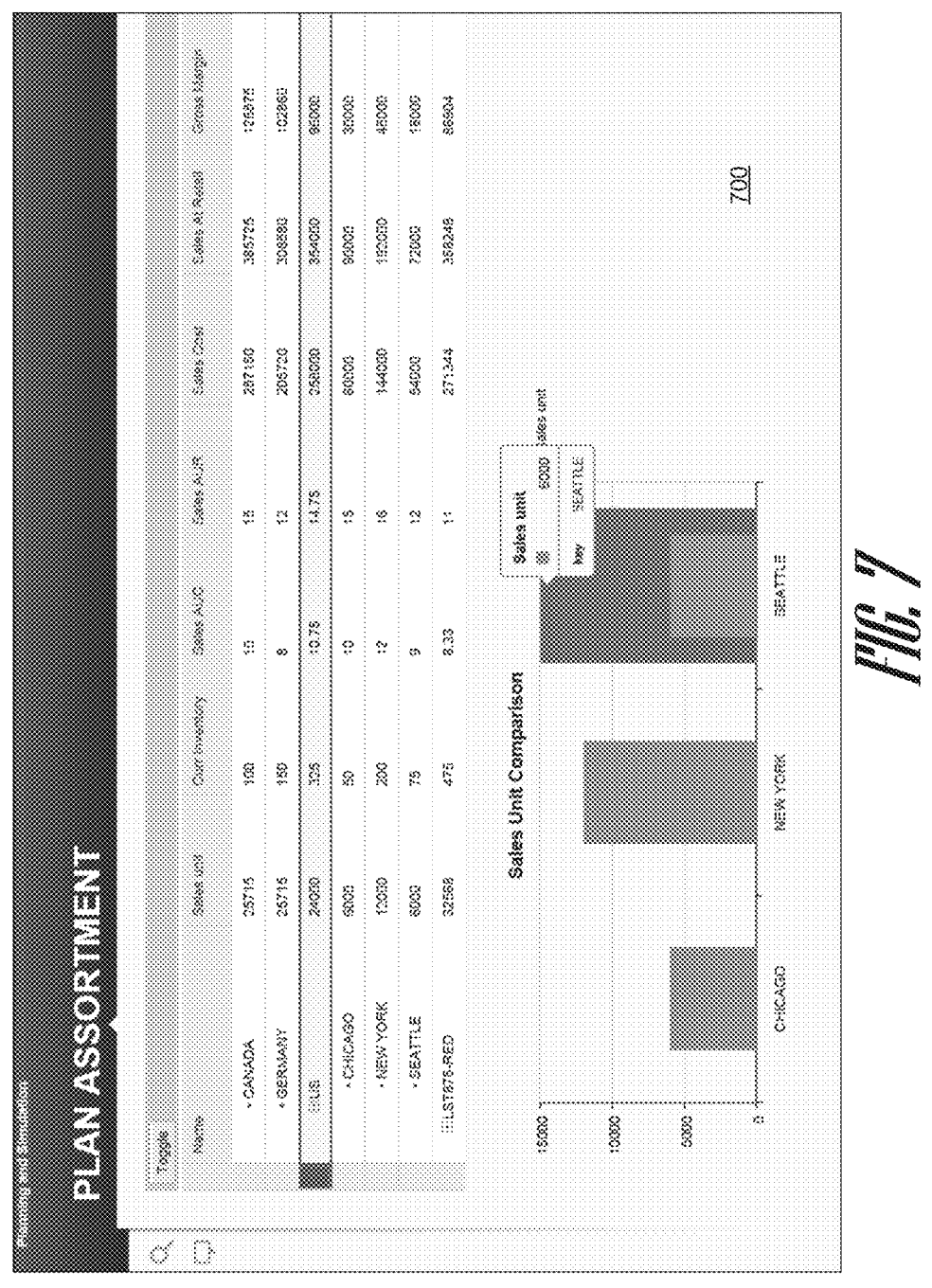

FIG. 7 is an example planning and simulation output 700, according to an example embodiment. The output 700 illustrates an example of an included hierarchy of how US data is inclusive of data for Chicago, N.Y., and Seattle. The output 700 may include additional data that may be viewed through scrolling.

The output 700 may be output as a static document, such as a page description language document. However, in other embodiments, or based on the permissions of a recipient, the output 700 may be provided in a fully or partially edited form. For example, some data items in the output may be locked, while others, such as assumptions on which the output 700 is based, may be manipulated. Thus, the output 700 in such editable instances may be provided in an interactive HTML5 or scripted interface, as a spreadsheet document that may be viewed and manipulated within a spreadsheet program, and in other formats depending on the particular embodiment.

Figure 8:
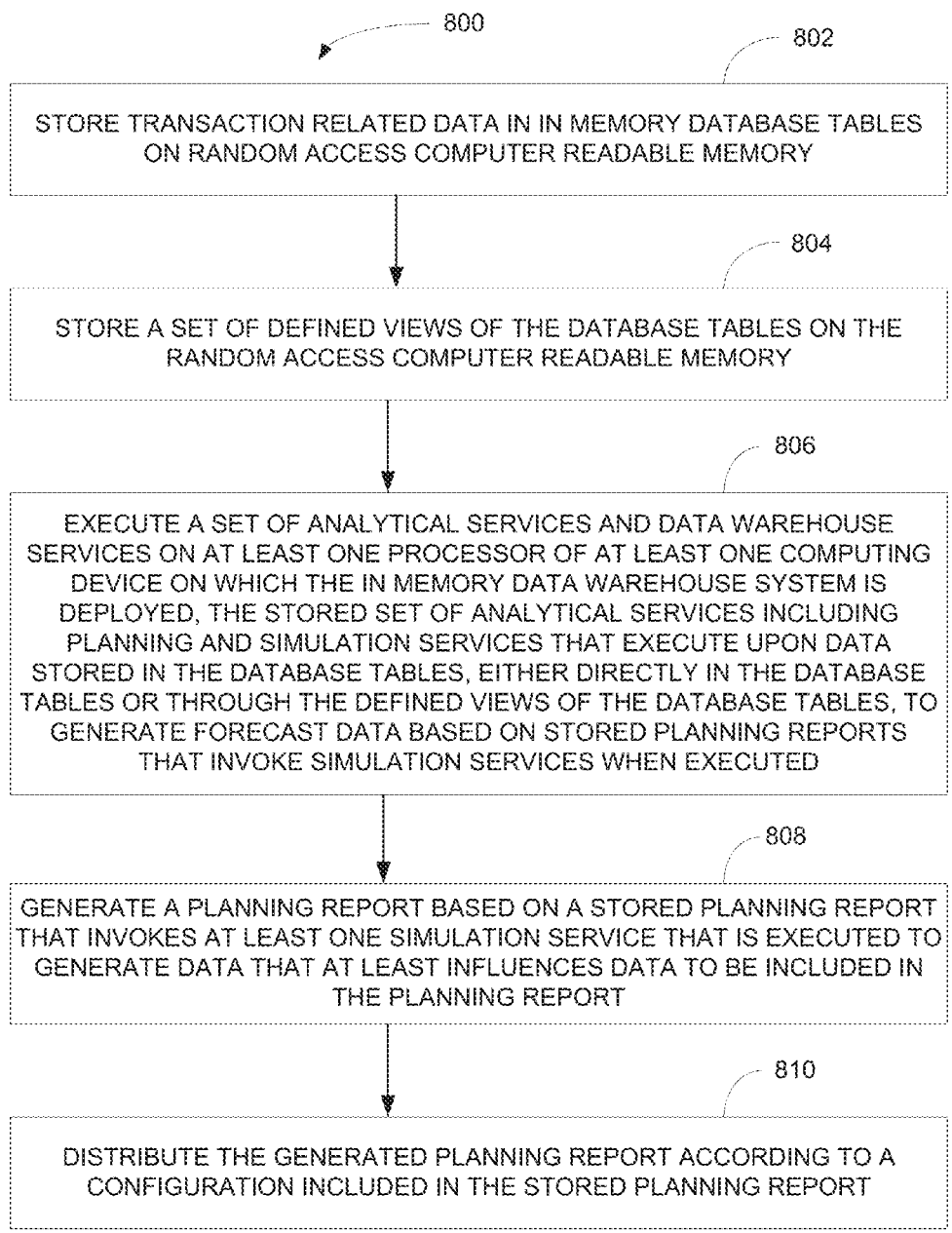
FIG. 8 is a block flow diagram of a method, according to an example embodiment.

FIG. 8 is a block flow diagram of a method 800, according to an example embodiment. The method 800 is an example of a method that may be performed on at least one computing device of an in memory database, such as an in memory database that also functions as an in memory data warehouse, such as the in memory data warehouse system 100 of FIG. 1. In some embodiments, the computing device on which the method 800 executes is a virtual machine deployed on hardware including a large memory array sized sufficiently to store an amount of data needed for a particular embodiment.

The method 800 includes storing 802 transaction related data in in memory database tables on random access computer readable memory and storing 804 a set of defined views of the database tables on the random access computer readable memory. The method 800 further includes executing 806 a set of analytical services and data warehouse services on at least one processor of the at least one computing device on which the in memory data warehouse system is deployed. In some such embodiments, the stored set of analytical services includes planning and simulation services. The planning and simulation services execute upon data stored in the database tables, either directly in the database tables or through the defined views of the database tables. In some embodiments, this data is executed upon by the planning and simulation services to generate forecast data based on stored planning reports that invoke simulation services when executed. In some embodiments, the forecast data, when generated, is stored by the method 800 in a planning view database table built upon a virtual data model of the in memory data warehouse. In some embodiments, invoking a simulation service may include retrieving forecast data from a planning view generated at a time prior to the generating of the planning report.

The method 800 may then generate 808 a planning report based on a stored planning report that invokes at least one simulation service that is executed to generate data that at least influences data to be included in the planning report. When the planning report is generated 808, the planning report may then be distributed 810 according to a configuration included in the stored planning report.

In some such embodiments, the configuration included in the stored planning report includes a broadcast and documents service configuration. The broadcast and documents service configuration typically includes data identifying when the stored planning report is to be executed and to whom and how the generated 808 report is to be distributed 810. The broadcast and documents service configuration is used to distribute 810 the report through execution of the broadcast and documents service.

In some embodiments, the broadcast and documents service may also be executed to invoke the generating 808 of the planning report based upon the stored planning report configuration. For example, when the configuration of the stored planning report includes data identifying when the stored planning report is to be executed, the configuration data may define a periodic schedule that is monitored by the broadcast and documents service to trigger execution of the stored planning report.

In other embodiments, the configuration data may define a data event that is monitored by the broadcast and documents service to identify an occurrence to trigger execution of the stored planning report. In some such embodiments, the broadcast and documents service may be informed of data events by an update process of the in memory data warehouse system. Based on such informing notifications of data events, the broadcast and documents service can determine whether any data events defined in stored planning report configurations are implicated.

Thus, with either defined periodically schedule or data events of planning report configurations, when the schedule is up or when a data event is implicated, the broadcast and documents service triggers execution of stored planning reports based on the respective stored planning report configurations.

In some embodiments, planning report configurations may be viewed and manipulated though data communications between a user client device and a web server that executes on the in memory data warehouse system to provide user interfaces. These user interfaces, in some embodiments, provide abilities and options to view and modify services and reports, configurations thereof, planning report output, and even invoke stored planning reports in some embodiments.

Figure 9:
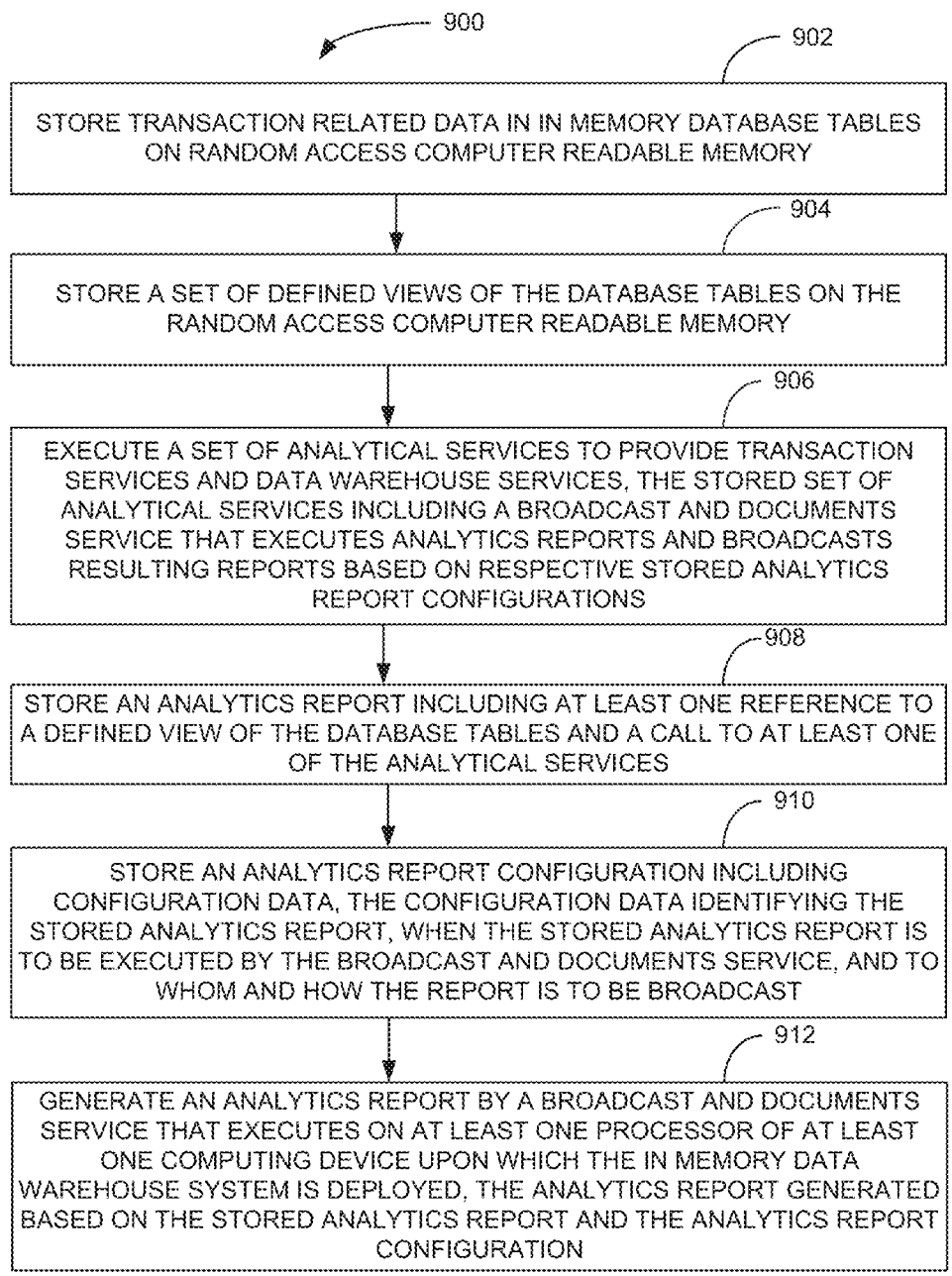
FIG. 9 is a block flow diagram of a method, according to an example embodiment.

FIG. 9 is a block flow diagram of a method 900, according to an example embodiment.

The method 900 is another example of a method that may be performed on at least one computing device of an in memory database, such as an in memory database that also functions as an in memory data warehouse, such as the in memory data warehouse system 100 of FIG. 1.

The method 900 includes storing 902 transaction related data in in memory database tables on random access computer readable memory and storing 904 a set of defined views of the database tables on the random access computer readable memory. The method 900 further includes executing 906 a set of analytical services to provide transaction services and data warehouse services. The stored set of analytical services, in some embodiments, includes a broadcast and documents service that executes analytics reports and broadcasts resulting reports based on respective stored analytics report configurations.

The method 900 additionally includes storing 908 an analytics report including at least one reference to a defined view of the database tables and a call to at least one of the analytical services. Also stored 910 by the method 900 is an analytics report configuration. Configuration data for the analytics report includes data identifying the stored 908 analytics report, when the stored 908 analytics report is to be executed by the broadcast and documents service, and to whom and how the report is to be broadcast. An analytics report may then be generated 912 by a broadcast and documents service that executes on at least one processor of at least one computing device upon which the in memory data warehouse system is deployed. The analytics report is generated 912 based on the stored analytics report and the analytics report configuration.

In some embodiments, the stored 910 analytics report configuration data identifying how the report is to be broadcast includes configuration data indicating the report is to be output in a particular document format and a communication medium over which the output report is to be transmitted.

Another embodiment is in the form of an in memory data warehouse system. The in memory data warehouse system in such embodiments includes a random access memory that stores sand manages in memory database tables. The in memory data warehouse system further stores a set of defined views of the database tables and a set of analytical services executable to provide transaction services and data warehouse services. The stored set of analytical services include a broadcast and documents service that executes analytics reports and broadcasts resulting reports based on respective stored analytics report configurations. The in memory data warehouse system further also stores an analytics report including at least one reference to a defined view of the database tables and a call to at least one of the analytical services. Additionally, the in memory data warehouse system in such embodiments stores analytics report configurations. Each of these configurations includes data identifying a stored analytics report, data identifying when the respective stored analytics report is to be executed, and data identifying to whom and how the respective reports are to be broadcast. The reports may be broadcast in various ways, such as by email, via a portal, a link or data element to be transmitted via a simple message service (SMS) message, and the like. The configurations may also define an output type, such as a file type of a word processing document, a page description language document format, and other file types.

Figure 10:
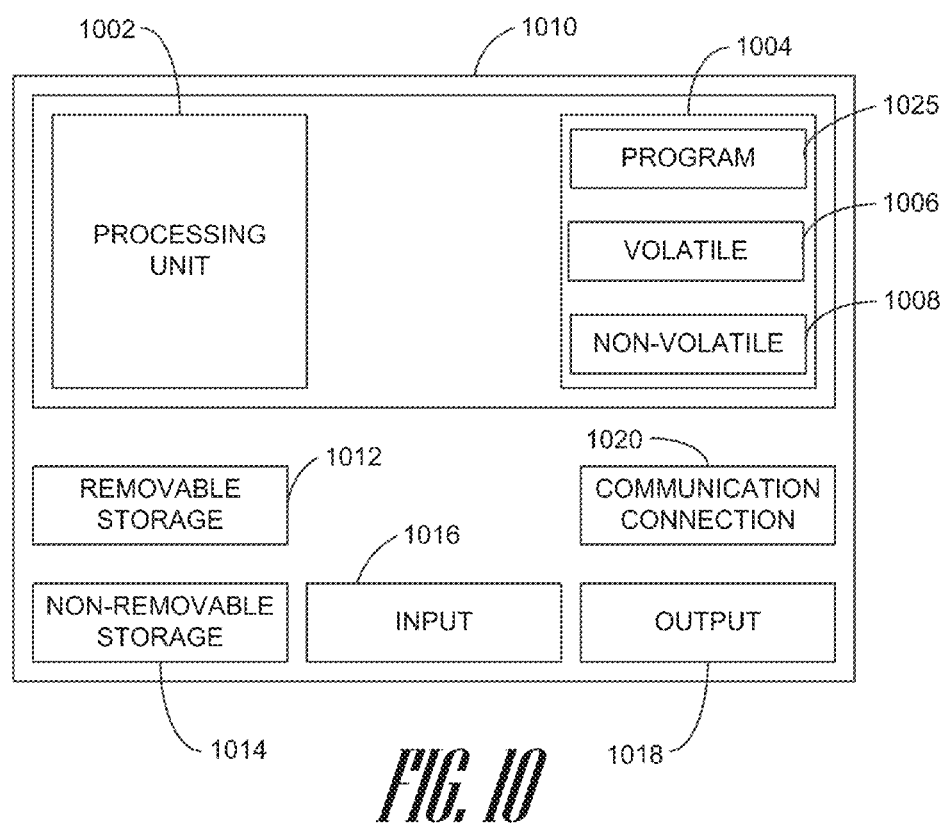
FIG. 10 is a block diagram of a computing device, according to an example embodiment.

FIG. 10 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 1010, may include a processing unit 1002, memory 1004, removable storage 1012, and non-removable storage 1014. Memory 1004 may include volatile memory 1006 and non-volatile memory 1008. Computer 1010 may include—or have access to a computing environment that includes—a variety of computer-readable media, such as volatile memory 1006 and non-volatile memory 1008, removable storage 1012 and non-removable storage 1014. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. In some embodiments, the computer 1010 includes or is coupled to at least one large memory 1004 array with the amount of memory 1004 measured in terabytes on which an in memory data warehouse stores data. Computer 1010 may include or have access to a computing environment that includes input 1016, output 1018, and a communication connection 1020. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1002 of the computer 1010. A hard drive (magnetic disk or solid state), CD-ROM, and RAM are some examples of articles including a non-transitory computer-readable medium. For example, various computer programs 1025, such as one or more applications and modules implementing one or more of the methods illustrated and described herein that executes on the processing unit and is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. An in memory data warehouse system comprising:
   an in memory database system, comprising:
      a random access memory to store and manage in memory database tables, the random access memory comprising a plurality of stored in memory database tables and a stored set of defined views of the database tables; and
      at least one computing device comprising at least one processor, wherein the at least one computing device is programmed to perform operations comprising;
         executing a stored set of analytical services to provide transaction services and data warehouse services, the stored set of analytical services including a broadcast and documents service that executes analytics reports and broadcasts resulting reports based on respective stored analytics report configurations,
         generating an analytics report including at least one reference to a first defined view of the database tables from the set of defined views and a call to at least one of the analytical services;
         storing the analytics report at the in memory database;
         storing an analytics report configuration including configuration data,
   wherein the configuration data identifies:
      the stored analytics report,
      a first data event that is monitored by the broadcast documents service to identify an occurrence to trigger execution of the stored analytics report and to whom and how the report is to be broadcast:
      sending, by an update process of the in memory database system and to the broadcast and documents service, a plurality of indications of data events;
      determining, by the broadcast and documents service, that a first indication of the plurality of indications indicates the first data event; and
      triggering, by the broadcast and documents service, execution of the stored analytics report.

2. The in memory data warehouse system of claim 1, wherein the configuration data identifying how the report is to be broadcast includes configuration data indicating the report is to be output in a particular document format and a communication medium over which the output report is to be transmitted.

3. The in memory data warehouse system of claim 2, wherein the communication medium is email and the particular document format is a page description language document format.

4. The in memory data warehouse system of claim 1, wherein:
   the stored analytics report is a planning analytics report; and
   the at least one reference to a defined view of the database tables includes a reference to at least one database table that is populated by data by a simulation service that executes within the in memory database system when an analytics report is generated based on the store analytics report.

5. The in memory data warehouse system of claim 4, wherein the stored analytics report includes configuration data to output an analytics report in the form of a spreadsheet program file, the spreadsheet program file including configuration data to connect a spreadsheet program to the in memory database system from which data of the at least one database table populated with data by the simulation service will be retrieved by the spreadsheet program for presentation.

6. The in memory data warehouse system of claim 1, further comprising an interface to interact with users and provide access to the analytical services and views to perform transactions and data warehouse functions on the database table.

7. The in memory data warehouse system of claim 6, wherein the user interface comprises:
   a specific analytical user interface utilizing HTML/OData; and.
   a generic analytical user interface utilizing SQL/MDX.

8. The in memory data warehouse system of claim 1, wherein the analytical services of the stored analytical services are executed within an analytical services engine that executes on at least one processor of at least one computing device upon which the in memory data warehouse system is deployed to provide an analytical services execution environment.

9. A method for-implementing an in memory data warehouse system utilizing an in memory database system, the method comprising:
   storing transaction related data in in memory database tables on random access computer readable memory:
   storing a set of defined views of the database tables on the random access computer readable memory;
   executing a set of analytical services to provide transaction services and data warehouse services, the set of analytical services including a broadcast and documents service that executes analytics reports and broadcasts resulting reports based on respective stored analytics report configurations;
   storing an analytics report including at least one reference to a defined view of the database tables and a call to at least one of the analytical services;

storing an analytics report configuration including configuration data, wherein the configuration data identifies:
the stored analytics report,
a first data event that is monitored by a broadcast and documents service to identify an occurrence to trigger execution of the stored analytics report, wherein the broadcast and documents service executes on at least one processor of at least one computing device upon which the in memory database warehouse system id deployed, and
to whom and how the report is to be broadcast; and
sending, by an update process of the in memory database system and to the broadcast and documents service, a plurality of indications of data events;
determining, by the broadcast and documents service, that a first indication of the plurality of indications indicates the first data event; and
triggering, by the broadcast and documents service, execution of the stored analytics report generating an analytics report by the broadcast and documents service the analytics report generated based on the stored analytics report, and the analytics report, configuration.

10. The method of claim 9, wherein the configuration data identifying how the report is to be broadcast includes configuration data indicating the report is to be output in a particular document format and a communication medium over which the output report is to be transmitted.

11. The method of claim 9, wherein:
the stored analytics report is a planning analytics report; and
the at least one reference to a defined view of the database tables includes a reference to at least one database table that is populated by data by a simulation service that executes within the in memory data warehouse system when an analytics report is generated based on the store analytics report.

12. The method of claim 11, wherein the stored analytics report includes configuration data to output an analytics report in the form of a spreadsheet program file, the spreadsheet program file including configuration data to connect a spreadsheet program to the in memory data warehouse system from which data of the at least one database table populated with data by the simulation service will be retrieved by the spreadsheet program for presentation.

* * * * *